Dec. 1, 1959                    J. L. PAINE                    2,915,359
                          OSCILLOGRAPHIC RECORDER
                          Filed Sept. 14, 1956
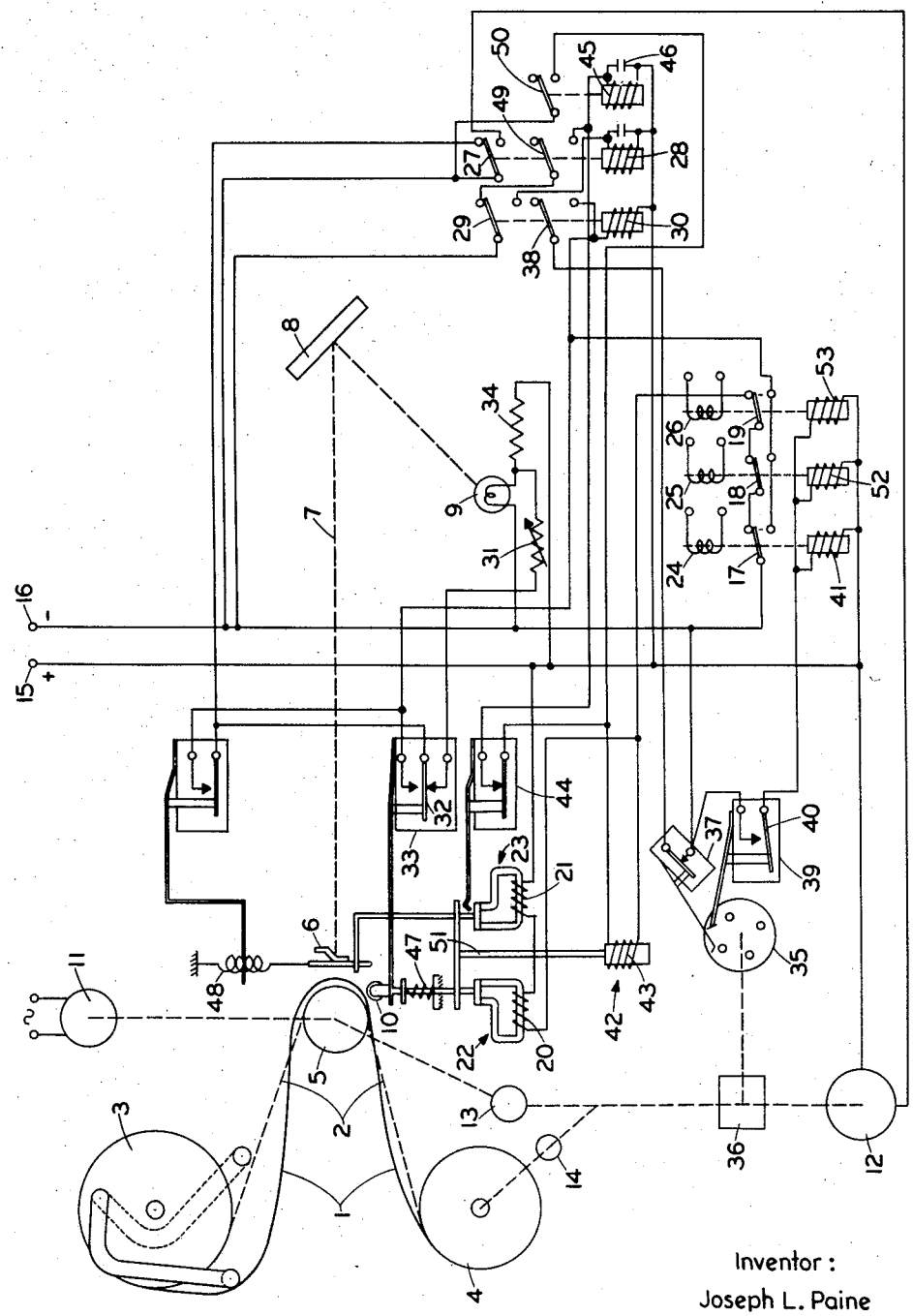
Inventor:
Joseph L. Paine
by  Richard E. Horley
His Attorney

United States Patent Office 2,915,359
Patented Dec. 1, 1959

2,915,359

OSCILLOGRAPHIC RECORDER

Joseph L. Paine, Marblehead, Mass., assignor to General Electric Company, a corporation of New York Application September 14, 1956, Serial No. 610,025

5 Claims. (Cl. 346—109)

My invention relates to oscillographic recorders and more particularly to automatic oscillographic recorders.

An automatic oscillographic recorder is a device which is designed to detect and record electrical phenomena. Recordation of the electrical phenomena is made by variations in the ampltiude of a light beam which is moved in accordance with the parametrical properties of electrical phenomena and which is projected on a recording medium strip or film moving at a rapid rate. Detection elements are provided to enable the recorder to operate automatically in certain applications where the time of occurrence of the phenomena is largely unpredictable. For example, an automatic oscillographic recorder is useful for monitoring electrical phenomena in a power transmission system where the phenomena may be caused by unforeseeable but not unexpected disturbances such as lightning strokes and grounding of transmission lines.

Such application contemplates comparatively long standby periods when no disturbances are present in the system being monitored and no recordation is necessary. During such periods, in the interest of economy, the recording strip is preferably at standstill. On the other hand, the recorder must be capable of being placed in operation quickly when a disturbance condition is present. It is desirable from the standpoint of accuracy in recording a condition to accelerate the recording medium strip from standstill to a predetermined rate of travel past a recording point in as a short a time as possible. It is further desirable from the standpoint of accuracy and economy to effectuate the opening and shutting of the shutter mechanism at the initiation and termination of movement of the strip.

It is an object of my invention to provide a new and improved oscillographic recorder having an improved strip moving system for overcoming the inertia of the strip and associated elements so as to obtain accurate recording of electrical conditions.

It is also an object to provide an improved drive system for certain elements of strip moving system to achieve the desired rapid acceleration of the recording medium strip.

It is a further object to provide an improved oscillographic recorder in which a new and improved means is provided for synchronizing the beginning and termination of recordation with the initiation and cessation of movement of the strip.

In accordance with my invention in its broadest aspects, I provide an oscillographic recorder in which the inertia of the recording medium strip is overcome by the dynamic inertia of a continuously rotating drive member. Means are provided which, in response to a condition to be recorded, moves the strip into engagement with the continuously rotating drive member. More specifically, the continuously rotating drive member is a roller mechanism having substantial inertia which imparts the necessary initial impulse to the recording strip when a retractable idler roller is actuated from a retracted position to bring the strip into frictional engagement with the drive roller in response to a condition to be recorded. Since the recording medium strip is of comparatively small inertia and the idler roller is likewise, the strip is brought up to the speed of the drive roller in a very short interval after engagement occurs.

In the preferred form, the idler roller is adapted to be operated simultaneously with a shutter which may be interposed between the galvanometer beam director of an optical system and the recording medium strip in the vicinity of the recording point past which the strip is moved.

It is an additional feature of my invention to provide a continuously operating auxiliary motor as part of a drive system which supplies the necessary torque to the drive member whereby the drive member acquires the dynamic inertia to bring the strip quickly from standstill to the predetermined rate of travel. It is intended that the drive system include a second or main motor which operates to assume the burden of driving the drive member and strip after the initial acceleration of the strip occurs and during the recording of the phenomena. The main motor which is preferably non-operative during standby is adapted to be energized by means responsive to the condition to be recorded on the strip. The main motor takes over the driving of the strip during the recording condition of the oscillograph but only after it is brought up to speed. A speed responsive means is provided to connect the main drive motor to the drive member when such a condition occurs. In the preferred form, the main motor is energized simultaneously with the operation of the retractable idler roller which presses the strip into engagement with the drive member.

Thus it will be seen that I have provided a new and improved oscillographic recorder capable of having quick starting to accurately record an electrical condition. It will be further seen that I have provided an improved strip moving system and drive system which are capable of accelerating a recording strip to a predetermined rate in a short interval.

The features of this invention which are believed to be novel are set forth with particularity in the appended claims. The invention itself may be better understood as to organization and construction as well as to further objects and advantages by reference to the following description taken in conjunction with the accompanying drawings in which:

The sole figure is a schematic diagram illustrating the mechanical and electrical components of an oscillographic recorder drive system and strip moving system.

In an oscillographic recorder constructed in accordance with my invention, a system in a preferred embodiment is provided as illustrated in the sole figure in which a recording medium strip 1 is adapted to be led from a supply roll 3 to a rewind spool 4 past a recording point at which is located a drive member 5. Interposed between the strip in the vicinity of the recording point is a shutter mechanism 6 designed to interrupt a light beam 7 projected in any suitable manner by an optical system including a galvanometer device shown generally at 8 and a light source 9 which may be continuously radiating. Movement of strip 1 past the recording point is effectuated by the drive member 5 in cooperation with retractable roller or idler 10 which acts to press the strip 1 into engagement with drive member 5 during recording condition of operation of the recorder.

A driving system for rotating drive member 5 preferably takes the form of an auxiliary drive motor 11 adapted to be continuously operating by connection to a power source, and a main drive motor 12 which is preferably a series high torque type motor. Continuous rotation is supplied to drive member 5 during both standby and recording conditions of operation by mechanical connection with auxiliary motor 11 and mechanical connection to main drive motor 12. A speed responsive device 13, in the form of an overdrive clutch preferably, is interposed mechanically between main drive motor 12 and drive member 5 to disengage drive member 5 from the main drive motor 12 when the speed of the latter is below a predetermined minimum. A friction clutch 14 connects the main drive motor 12 to rewind spool 4 to run a little fast to keep the strip 1 tight on the rewind spool 4.

A control arrangement for operating the strip drive system is shown having a pair of terminals 15 and 16 for connection to a suitable source of power. Connected across the source of power is a series of double acting contacts 17, 18, and 19 which are connected in a series circuit with a pair of coils 20 and 21 of holding magnets 22 and 23. Three condition detecting relays 24, 25, and 26 are connected to contacts 17, 18, and 19, respectively, which are operable to open said circuit in response to a condition to be recorded. More specifically the relays 24, 25 and 26, may be responsive to overcurrent, overvoltage and undervoltage, respectively. Suitable connections to make them so operate may be of any type well known in the art which are capable of producing a fast acting response. For example relay 24 may be connected to a current transformer (not shown) which is capable of energizing the relay 24 in excess of a predetermined amount proportional to an overcurrent condition in the system to be monitored. Thus, upon occurrence of the overcurrent condition, relay 24 will become energized above a predetermined current setting to operate contact 17 to a second position. This opens the circuit to the coils 20 and 21 to de-energize the holding magnets thereby releasing the idler roller 10 and shutter mechanism 6 to initiate the recording of the condition.

The main drive motor 12 is adapted to be connected across the power source when contact 27 of relay 28 is moved from the normally closed position as shown to its second switching position. Relay 28 is energizable when connected across the power source by contact 29 in a second switching position. Relay 30 is energizable when contact 17 assumes the second switching position heretofore mentioned upon the occurrence of an overcurrent condition which energizes relay 24.

A light source 9 is adapted to be continuously radiating and to be brightened upon the initiation of the recording operation. Light source 9 is connected across the power source in a series circuit with current limiting resistor 34 including a bypass or shunt circuit across light source 9 comprising resistor 31, contact 32 of idler roller interlock 33, and normally closed contact 27 of relay 28. The light source 9 in series with resistor 34 is connected directly across the power source during recordation to give an increased brilliance by opening the current shunting or bypass path through resistor 31, the bypass circuit being opened by operation of the idler roller interlock 33.

The length of record is controlled by a record length controller 35 which is mechanically connected through a suitable reduction gear 36 to main drive motor 12. Record length controller 35 operates a record length control switch 37 connected in series with contact 38 of relay 30 which in the second switching position maintains relay 30 across the power source during recordation. Record length controller 35 also operates a reset switch 39 having contact 40 which in the closed condition is in series circuit with reset coil 41 for actuating contact 17 to the first switching position.

A reset solenoid 42 for restoring idler roller 10 and shutter mechanism 6 to standby condition is provided with a coil 43 connected in series circuit with the series of contacts 17, 18, and 19, the normally closed contacts of reset interlock 44 and relay 45 across which is connected a time delay capacitor 46.

A further understanding of the nature of my invention can be obtained by considering the sole figure in connection with the following description of the operation:

As illustrated, the strip moving system is in standby condition. The auxiliary motor 11 of the drive system is operating, being connected to a suitable power source. The main drive motor 12 is disengaged from the driving connection of the drive member 5 since it is de-energized, having been open circuited by contact 27 of relay 28, shown in its normally closed condition. Recording medium strip 1 is in slack condition out of contact with drive member 5 and is at standstill with shutter mechanism 6 closed to intercept light beam 7 and retractable idler roller 10 is in retracted position. Both the shutter mechanism 6 and retractable idler roller 10 are maintained in the positions shown by virtue of the holding or restraining actions of the energized holding magnets 22 and 23 which operate to overcome the bias of springs 47 and 48 respectively. Light source 9 is connected across the power supply (not shown) and is radiating light at a reduced level of brilliance due to connection of a bypass circuit including adjustable resistor 31 and contact 32 of interlock 33.

During standby condition, the drive member 5 is continuously rotating at a speed calculated to impart substantial dynamic inertia to the drive system for initiation of movement to accelerate strip 1 to a predetermined rate of travel in the shortest time possible. The amount of inertia can be controlled by the mass of the drive member 5 itself or by the combined mass of the entire drive member mechanism including drive motor 11, or additionally, other mass elements such as a flywheel (not shown) may be provided.

With these conditions present at standby when the oscillographic recorder has not detected a condition to be recorded, the operation which initiates recording operation will be considered in regard to an overcurrent condition. As previously described, relay 24 detects the presence of an overcurrent condition in a system being monitored. Through an appropriate electromechanical action contact 17 is switched to its second position opening the series circuit comprising the coils 20 and 21 of holding magnets 22 and 23. Idler roller 10 is released to move in accordance with the bias imposed by spring 47 to press the strip 1 into frictional engagement with the rotating drive member 5 which because of its high dynamic inertia and the comparatively low combined inertia of the strip 1 in its slack condition and the idler roller 10, immediately supplies an impulse tending to accelerate the strip from standstill to cause it to move past the recording point while using up the slack. Simultaneously with this operation, the shutter mechanism 6 moves in accordance with the bias imposed by spring 48 to permit passage of light beam 7 onto the sensitized surface of the strip 1. With this arrangement, it is possible to adjust the action of the idler roller 10 and shutter mechanism 6 to operate simultaneously so as to move the strip 1 at approximately the instant when light from beam 7 strikes the sensitized surface. By suitable mechanical connection, idler roller 10 in moving actuates interlock 33 to switch contact 32 to a second position. Thus the bypass circuit containing resistor 31 which was adjusted to maintain the light source 9 at reduced brilliance is opened and light source 9 is then energized through resistor 34 which operates as a current limiting resistor. Thus brilliance increase is provided with the synchronized operation of the idler roller and shutter mechanism making available a more readable recording.

By the operation of relay 24, contact 17 is moved to a second switching position to close a circuit whereby relay 30 was energized producing the following results. Contact 29 of relay 30 moved to a second switching position to energize relay 28. Contact 38 of relay 30 moved to a second switching position to close a circuit holding the relay 30 in energized condition across the power source. Relay 28 being energized contact 27 is moved to a second switching position to place the main drive motor 12 across the power source to start its operation from standstill. The main drive motor 12 is preferably a series type and has considerably more torque to take over a greater driving burden than motor 11. Thus main drive motor 12 in operating rotates rewind spool 4 through friction clutch 14 and record length controller 35 through reduction gear 36. When main drive motor 12 has been brought up to speed it takes over the driving of the drive member 5 from motor 11 when overdrive clutch 13 engages. With proper adjustment, selection of parts, and timing, the main drive motor 12 will assume the drive burden at approximately the time when the strip 1 has become taut as shown by broken line 2, and will maintain a constant rate of travel of strip 1 past the recording point while also turning the supply roll due to the taut condition of the strip and rotating rewind spool 4.

The strip moving system will continue for a preselected period of time which may be set on record length controller 35 which may be a revolution counter designed to operate a shutdown set of switches such as record length control switch 37 and reset switch 39. Assuming that when such action occurs, the overcurrent condition no longer exists, the following sequence will result. Contact 40 of switch 39 will close to energize reset coil 41. Contact 17 of relay 24 is actuated in a suitable manner to its first switching position. The holding circuit for relay 30 is opened and contacts 29 and 38 return to the standby position shown. This de-energizes relay 28 to operate contact 27 to open circuit the connection of main motor 12. Simultaneously with operation of contact 17, relay 45 and reset solenoid coil 43 are energized. When contact 29 of relay 30 is closed in series with contact 49 in its second position, relay 45 is energized which closes contact 50 to close a holding circuit for solenoid reset coil 43. The mechanical extension 51 from reset solenoid 42 engages retractable idler roller 10 and shutter mechanism 6 to return them to their standby position. The retraction of the mechanical extension 51 operates interlock 44 to open circuit relay 45 to de-energize solenoid coil 43 after a time delay caused by capacitor 46. Retraction of idler roller 10 operates interlock 33 to restore the bypass circuit including resistor 31 to diminish the brilliance of light source 9.

Simultaneously with the retraction of idler roller 10 and shutter mechanism 6 main drive motor 12 has been disconnected from drive member 5 by overdrive clutch 13 and continued rotation of drive member 5 has been assumed by auxiliary motor 11. The strip 1 is returned to a slack condition, by any suitable means, out of contact with drive member 5 which rotates continuously at a fixed speed to create the necessary dynamic inertia for subsequent recordations. Similar operation occurs for overvoltage and undervoltage conditions with contacts 18 and 19 being operated by relays 25 and 26 and reset by relays 52 and 53.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. For use in an oscillographic recorder having a movable recording strip adapted to be moved between a supply roll and a rewind spool, a strip moving system comprising a continuously rotatable drive member of substantial kinetic inertia, said rotatable drive member being adapted to rotate in the absence of a strip moving signal to establish a standby condition of operation, a strip normally disposed out of contact with said rotatable drive member providing a slack supply intermediate the supply roll and the drive member during said standby condition of operation, a retractable roller mechanism the non-stationary portions of which include a roller and have little inertia relative to said rotatable drive member for pressing said strip into frictional engagement with said drive member, and means responsive to a condition to be recorded for establishing a strip moving condition of operation by actuating the non-stationary portions of said retractable roller mechanism to move said slack strip into engagement with said drive member, whereby said recording strip is quickly actuated into movement from a standstill position.

2. For use in an oscillographic recorder having a strip moving system including a strip driving member adapted for continuous rotation throughout standby and recording conditions of operation and pressure means to move the strip so as to be engageable with said drive member to move the strip during the recording operation, the strip being disposed out of contact with said rotatable driving member in the standby condition, a drive mechanism for supplying continuous torque to said drive member comprising a first motor adapted to be continuously operating and to drive said drive member during standby, a second motor disconnected from said drive member and de-energized during standby, means responsive to a condition to be recorded for simultaneously actuating said pressure means into engagement with said drive member and energizing said second motor, and speed responsive means adapted for connecting said second motor to said drive member during the recording condition of operation, whereby said recording strip is quickly actuated into movement from a standstill position.

3. For use in an oscillographic recorder having a strip moving system including a strip drive roller adapted for continuous rotation throughout standby and recording conditions of operation of said recorder, the strip being disposed out of contact with said drive roller in the standby condition and a pressure roller engageable with said drive roller to move the strip during the recording condition of operation, a drive mechanism for supplying continuous torque to said drive roller comprising an auxiliary drive motor adapted to be continuously energized and to drive said drive roller during standby condition, a main drive motor mechanically disconnected from said drive roller and non-operating during standby, electromechanical means responsive to a condition to be recorded for simultaneously energizing said main drive motor and operating said pressure roller into engagement with said drive roller, and overdrive clutch means adapted for connecting said main drive motor to said drive roller during the recording condition of operation, whereby said recording strip is quickly actuated into movement from a standstill position.

4. For use in an oscillographic recorder, a supply roll, a recording strip leading from said supply roll past a recording point, said strip having excess slack supply intermediate said supply roll and said recording point, a continuously rotating drive roller at said recording point out of contact with said strip, a retractable idler roller actuable to press said strip into frictional engagement with said drive roller, first and second drive motors adapted to successively cooperate to continuously rotate said drive roller, said first motor being continuously operative including the period when said strip is out of contact with said drive roller whereby kinetic rotational energy is stored in said drive roller, said second motor being adapted to become operative simultaneously with the actuation of said idler roller in response to a condition to be recorded whereupon said slack supply is depleted and said second motor drives said drive roller and said supply roll.

5. For use in an oscillographic recorder having a moving recording medium strip adapted to be moved between a supply roll and a rewind spool and to record a light beam from a galvanometer, a condition-sensitive actuating mechanism comprising, a continuously rotatable drive member, a stationary strip disposed out of contact with the rotatable drive member providing a slack supply intermediate the supply roll and the drive member in the absence of said condition, a retractable idler roller mechanism the non-stationary portions of which are of little inertia compared with said drive member adapted for pressing said strip into frictional engagement with said drive member, a light shutter associated with said condition-sensitive actuating mechanism, an operating mechanism adapted to be responsive to a condition to be recorded for simultaneously actuating said shutter and the non-stationary portions of said idler roller mechanism to simultaneously initiate recording and movement of said slack strip, whereby said recording strip is quickly actuated into movement from a standstill position, and electromagnetic means embodied in said operating mechanism for simultaneously resetting said idler roller and said shutter into retracted and closed positions, respectively.

References Cited in the file of this patent

UNITED STATES PATENTS

| | | |
|---|---|---|
| Re. 18,956 | Dyche | Sept. 19, 1933 |
| 747,236 | Schaefer | Dec. 15, 1903 |
| 1,958,897 | Leyland | May 15, 1934 |
| 2,259,139 | Oesinghaus | Oct. 14, 1941 |
| 2,535,498 | Kornei | Dec. 26, 1950 |
| 2,539,832 | Hathaway | Jan. 30, 1951 |
| 2,704,639 | Shields | Mar. 22, 1955 |

FOREIGN PATENTS

| | | |
|---|---|---|
| 743,269 | Great Britain | Jan. 11, 1956 |